United States Patent Office 3,524,101
Patented Aug. 11, 1970

3,524,101
TRIGGERING DEVICE FOR SPARK-GAP
Spartacus Barbini, Chaville, France, assignor to Compagnie Generale D'Electricite, Paris, France, a corporation of France
Continuation of application Ser. No. 406,866, Oct. 27, 1964. This application Mar. 2, 1967, Ser. No. 635,635
Claims priority, application France, Oct. 28, 1963, 952,065, 952,066, 952,067; June 4, 1964, 977,058
Int. Cl. H05h 37/02
U.S. Cl. 315—150                              14 Claims

ABSTRACT OF THE DISCLOSURE

A device for quick closing of high voltage circuits under conditions of precise timing and extremely short time lag by triggering a power spark-gap defined by spaced electrodes with the direct application of a focused or nonfocused laser beam. The beam may be directed to one of the electrodes, a counter-electrode isolated from the spark-gap electrodes, or directed to the space between the electrodes.

---

This application is a continuing application of Ser. No. 406,866, filed Oct. 27, 1964, now abandoned.

The present invention has for its purpose to provide a solution to the problems arising from the necessity of quick closing of the electric circuits in which an electric energy storage must deliver a very large current into a relatively weak load under a very high voltage. The very quick passage of a very large electric energy is very difficult to achieve because the circuit breakers or the switches generally used to close the electric circuits do not possess the required characteristics, namely a steep enough rising front with a large enough closing capacity and a small enough control time constant.

The closure of a very high voltage circuit is frequently effected through the triggering of an electric arc between spark-gaps inserted in the circuit. With modern techniques making use of very high voltage discharges, it is becoming increasingly necessary to achieve operation under conditions of precise timing and with increasingly short and reproducable time lags between control and triggering of the arc. The very high voltage spark-gaps in which modern closing systems are employed must, in addition have a sufficiently high closing capability while at the same time ensuring a high degree of reliability.

In some cases, the sudden discharge of an electric energy storage into a relatively weak impedance circuit is obtained by means of electrodes between which occurs an electric arc when the difference of potential between the electrodes exceeds the breakdown voltage.

It has also been suggested to place between the electrodes an insulating shield, the destruction of which would allow the passing of a discharge spark; this destruction being obtained by the shattering effect of an explosive cap, for example mercury fulminate. This solution proved to be unsatisfactory; the effect of the explosive being insufficiently quick.

According to the present invention, the coherent radiation emitted by a laser makes it possible to find a solution to these problems. By applying a laser beam to power spark-gaps, the present invention has provided a solution to overcome the above-mentioned difficulties. In particular, the invention provides solutions involving the triggering of a power spark-gap by directly applying a focused or nonfocused laser beam to one of the electrodes, or a counter-electrode isolated from the spark-gap electrodes, or to the space between these electrodes.

Accordingly, the object of the present invention is to provide a device for the triggering of a spark-gap, and more particularly the ionization of the dielectric between the electrodes of the spark-gap by a device of the type designated by the abbreviation "laser."

Another object of the invention is to provide a device for the closing of the circuit not by ionization of the gaseous medium between the electrodes, but by destroying an insulating shield placed between these electrodes.

According to one embodiment of the invention, a solid dielectric material shield is placed between the electrodes of the spark-gap, the spark-gap discharge being obtained by destroying this shield with a light beam, of very high energy density, delivered by a laser. This method of application allows the utilization of electrodes with appropriate insulators, the position of the electrodes being adjustable.

According to one embodiment of the present invention, the laser beam used for the triggering of the spark-gap may be set into action in such a manner that its energy is used in a load in addition to the energy of the electric discharge in the spark-gap. It is thus possible to realize devices of quick discharge in enclosures used for the studying of plasmas.

Further objects of the invention include embodiments of spark-gaps, combined with other devices. Other advantages and characteristics of the invention will appear from the following description, by no means limitative and which will be better understood with reference to the accompanying drawings, in which:

Figure 1:
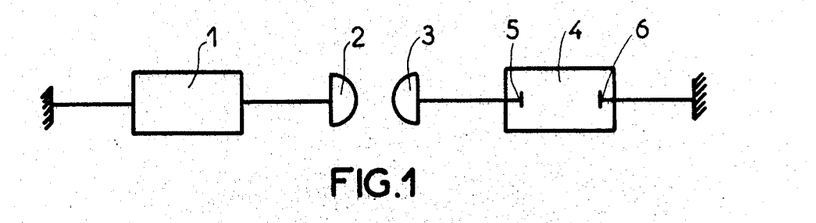
FIG. 1 represents the general diagram of a discharge circuit.

FIG. 1 is a schematical representation of a discharge circuit composed of an electric energy storage 1 (for example, a capacitor) connected, on the one hand, to earth, and, on the other hand, to an electrode 2, the other electrode 3 being connected to earth through the intermediary of a load 4. In the case of a device intended for use in laboratories for studying the behavior and the properties of a gas subjected to the action of a high energy electric arc, the load 4 may be a tube comprising two electrodes 5 and 6 filled with the gas to be studied. The electric energy storage may be a capacitor loaded to 100 kilovolts and storing an energy of the order of 100 kilojoules. The electric discharge in this tube is obtained when the electrodes are short-circuited by an electric arc, the production of the electric arc being a function of the parameters determined by Paschen's law. The discharge in the tube, the gas of which is advantageously subjected to preliminary ionization, then depends on the discharge between the electrodes 2 and 3 brought to a difference of potential higher than the breakdown voltage. This breakdown voltage can be considerably lowered by previous ionization of the gaseous dielectric between the electrodes of the spark-gap. It depends, however, on the geometrical shape of the electrodes which can be designed to make use of the "effect of points."

Figure 2:
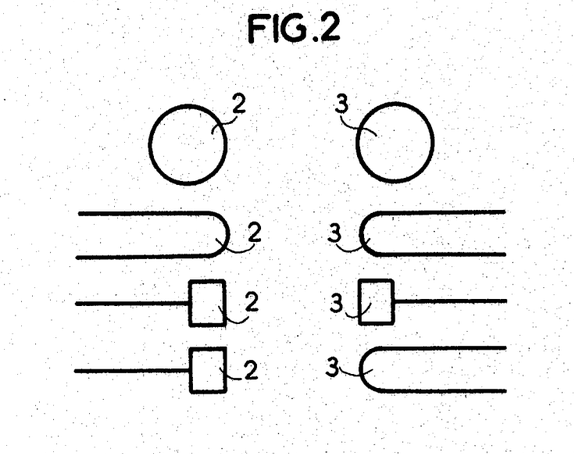
FIG. 2 is a sectional view of possible structures of electrodes.

FIG. 2 represents schematically sections of different types of electrodes used in devices called spark-gaps. The discharge of a circuit such as the one represented in FIG. 1 can be obtained by lowering the breakdown voltage caused by a partial ionization of the dielectric space between the electrodes. Different types of devices allow partial ionization of this dielectric space. The best known are those which make use of a radiation, such as X-rays, high frequency electromagnetic fields or sparking devices of the type of the sparking plugs used in internal combustion engines.

According to the present invention, the triggering of the spark-gap is carried out by a laser beam.

Figure 18:
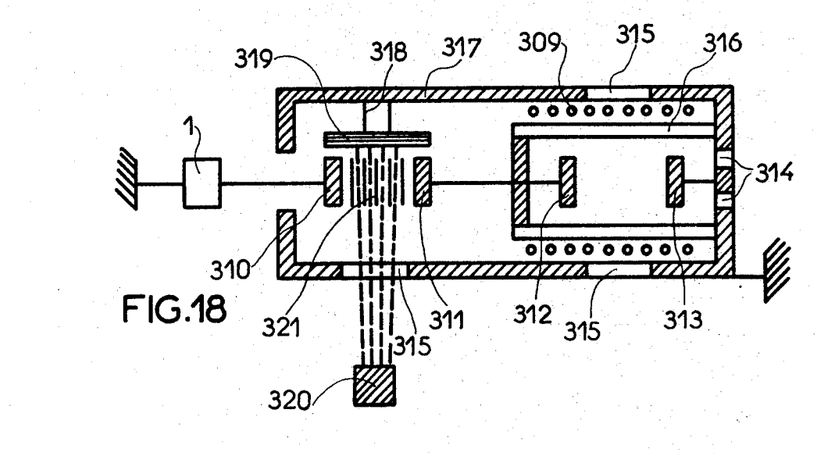
FIG. 18 represents a sectional view of a gas ionization and striction apparatus according to the invention.
Figure 20:
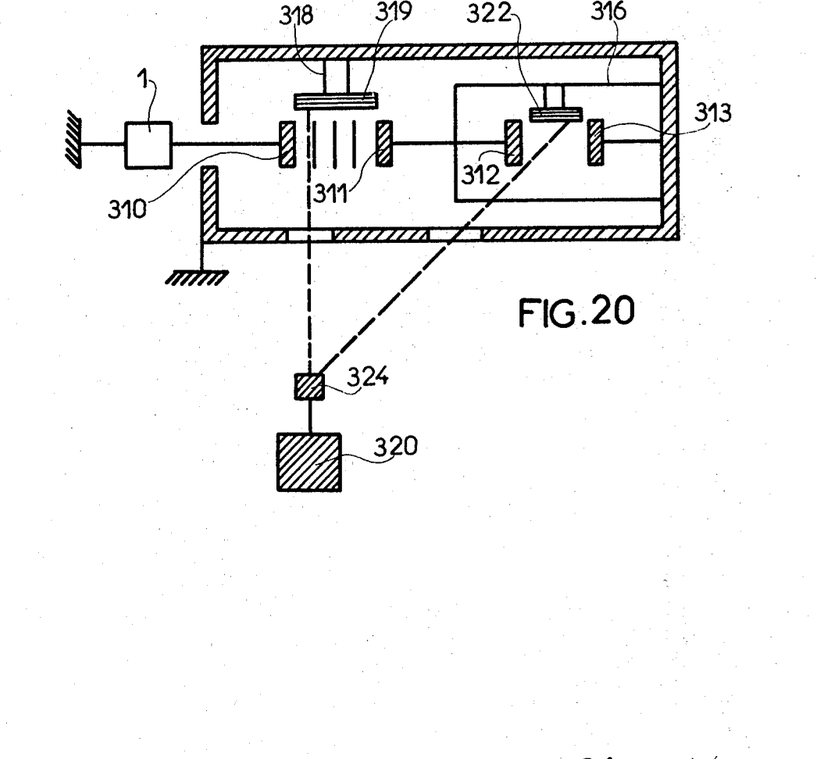

FIGS. 3, 4, 5, 6, 7, 8, 9, 10, 11 and 12 schematically show several embodiments of spark-gap arrangements including arc-triggering devices according to the present invention. The embodiments of the FIGS. 3, 5, 6, 7, 8 and 9 have in common the fact that a laser beam is directed onto one of the electrodes of a spark-gap. The embodiments of the FIGS. 4, 10 and 11 have in common the fact that the laser beam passes through the space between the electrodes without impinging these electrodes. The embodiment of FIG. 12 relates to a combination that comprises a double spark-gap, the laser beam passing axially through one of the spark-gaps without impinging the electrodes, and through the other spark-gap without impinging the electrodes. Lastly, FIGS. 18 and 20 illustrate another embodiment wherein the beam of a laser impinges a counter-electrode.

Figure 3:
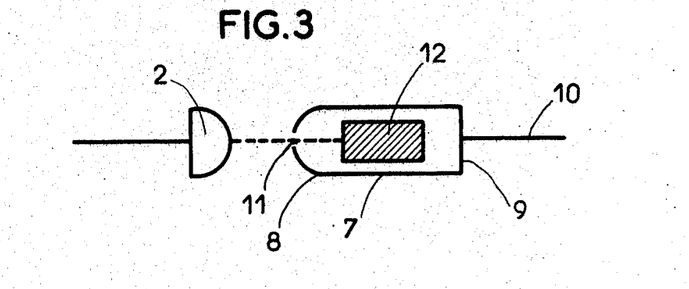
FIG. 3 is a sectional view of an example of embodiment of a spark-gap according to the invention.

In FIG. 3, the spark-gap electrode 2 is of the conventional type, while 7 denotes a schematic sectional view of a spark-gap electrode according to one aspect of the invention. This latter electrode is constituted by a cylindrical body 7 closed at 9 by a plane surface connected to the conductor 10, and at 8 by rounded surface provided with an opening 11. Inside the electrode 7 is placed a laser 12 which is able to send a beam of luminous rays onto the electrode 2 through the opening 11. The laser 12, the control connections of which are not represented on the figure, may be a triggered or non-triggered laser. The triggered lasers present the advantage of allowing the creation of a very strong focusing, that is concentrating, of the energy of the emitted beams, which will be used to ionize, by heating, the gaseous dielectric between the electrodes. The non-triggered laser does not allow such significant concentration of the energy, and the ionization of the gaseous dielectric will be then obtained by a thermionic effect combined with the heating effect in the intermediary space between the two electrodes. The spacing of the electrodes may advantageously be adjustable to adapt the apparatus to the discharge voltage or to the gas to ionize.

In addition to the heating of the gaseous medium and to the thermionic effect, the laser beam being a high energy electromagnetic wave, there are other effects, such as dissociation of the molecules of the gas by the electric field of the beam and tearing away by the same field of the electrons of the space charge surrounding the negative electrodes of the spark-gap.

The arrangement of the electrode, as shown in FIG. 3, offers a number of advantages, particularly because the laser which is enclosed therein does not undergo any electrical magnetic influence from the current which crosses the body 7.

The control of the laser can be independent of the discharge circuit or servo-controlled to any parameter of the circuit (load of the storage, cooling of the gas tube, etc.). For example, a part of the electric energy of the storage 1 can be used to supply the flash of the laser, the flash lightning being controlled by a voltage impulse given by a control impulse generator.

Figure 5:
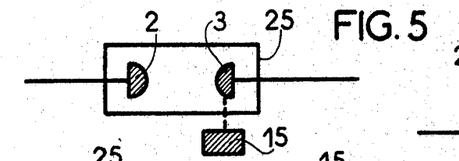
Figure 6:
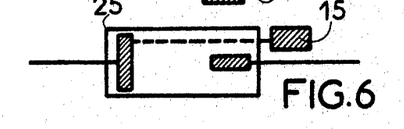
Figure 7:
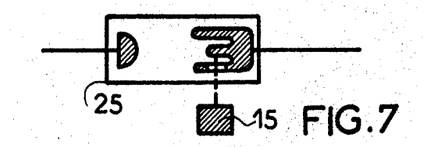

FIGS. 5, 6 and 7 show several embodiments of the invention where the laser is located outside the spark-gap; as shown in FIG. 5, the electrodes of the spark-gap are located in an enclosure 25, the laser 15 being located outside, the laser beam being substantially transversal to the axis defined by the electrodes 2 and 3 and impinging the electrode 3 for example. In the embodiment of FIG. 7, the electrode is formed by a central part surrounded by a lateral wall having an aperture for letting through the laser beam directed onto said central part. In the embodiment of FIG. 6, the laser beam is substantially parallel to the axis defined by the electrodes, whereas in FIG. 8, the laser beam passes through an aperture or channel provided in the electrode 3.

Figure 8:
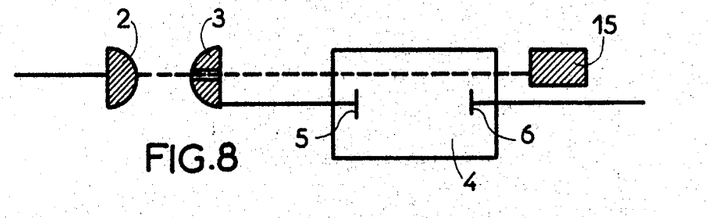

The locating of the laser outside the spark-gap offers many advantages by the fact that it eliminates the insulating problem of the laser control circuits. Moreover, in the case of triggered lasers, the luminous beam may be split into two parts, as in FIGS. 8 and 9, one being directed to the spark-gap as it has been described above, the other part of the beam being used to produce the partial ionization of the gas enclosed in the discharge tube constituting the load 4 of the electric circuit as shown in FIG. 1. According to the invention, other arrangements of the laser are possible; for example, the laser beam may cross the discharge tube 4, constituting the load of the circuit, before striking the electrode 2 through an opening provided in the electrode 3 (FIG. 8).

The spark-gap according to the invention can be embodied with numerous other variants, examples of which follow. The electrodes of the spark-gap can be symmetrical (2–3, FIG. 4), the laser 15 being located outside. The shape of the electrodes depends on the position of the laser and on the required parameters of operation.

Figure 4:
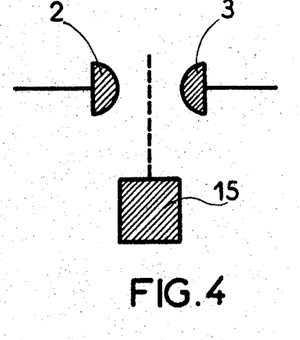
FIGS. 4, 5, 6, 7, 8, 9 show variants of the device according to the invention.

In the case of FIG. 4, while not necessarily, the laser 15 is advantageously a triggered laser, the focusing of its beam enabling it not to be directed onto one of the electrodes but onto the volume of dielectric gas between the two electrodes. The electrodes can be housed in an enclosure 25 under a weak gas pressure easily ionizable, the enclosure being provided with a window allowing the passage of the luminous beam of the laser. The enclosure housing the electrodes also can be under vacuum.

It is possible to enlarge the application of such a device as represented in FIG. 4, with several spark-gaps. In this case, the axis of a laser device crosses the spaces between the electrodes of several spark-gaps spaced from but along said axis. The laser beam is then used as a parallel beam or, as a variant, may be focused on one of the electrodes of the last or most remote spark-gap. If it is possible to replace a spark-gap for U kilovolts by $n$ partial spark-gaps in series, each operating under the voltage $U/n$, the cost of the installation will be considerably lowered for a convenient value of $n$.

According to another characteristic of the invention, a possible embodiment of such an arrangement would be to connect $n$ partial spark-gaps in series and to place them along the axis of a laser beam which, at the moment of its appearing, will trigger all of them at the same time.

Preferentially, the axes of the spark-gaps are set perpendicularly to the axis of the laser and are, or not, parallel to each other and the axis of the laser beam crosses each space between electrodes substantially in its middle. But one may deviate from these conditions without going beyond the scope of the invention. The shapes of the electrodes and their spacing can be identical in all the spark-gaps or variable from one spark-gap to the other as well as the voltages. Further, the spark-gaps may belong to different circuits.

Figure 10:
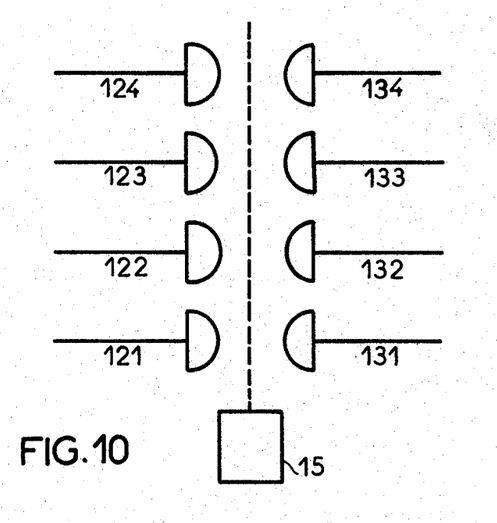
FIG. 10 shows the application of the device according to the invention or the simultaneous triggering of several spark-gaps.

Along the axis of a laser 15 are aligned $n$ spark-gaps, four of which are represented in FIG. 10. The spark gaps are constituted by the electrodes 121–131, 122–132, 123–133, 124–134. When the laser emits its radiation beam along its axis, all the spark-gaps are simultaneously triggered in an extremely short time.

Figure 11:
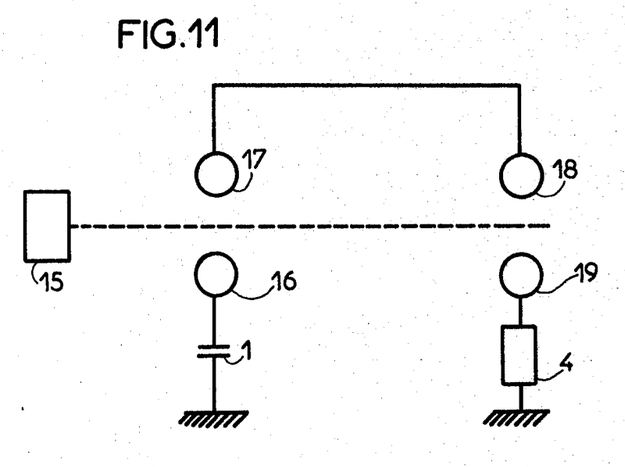
FIG. 11 represents an example of application to a spark-gap divided into partial gaps.

In FIG. 11, a source of direct voltage, for example a loaded capacitor 1 under a voltage U, can discharge itself into a load 4 through two spark-gaps 16, 17 and 18, 19, each of which can absorb a voltage $U/2$. When a laser 15 emits its radiation, the two spark-gaps are simultaneously triggered and the discharge occurs. The two spark-gaps shown are chosen as a non-limitative example.

Figure 12:
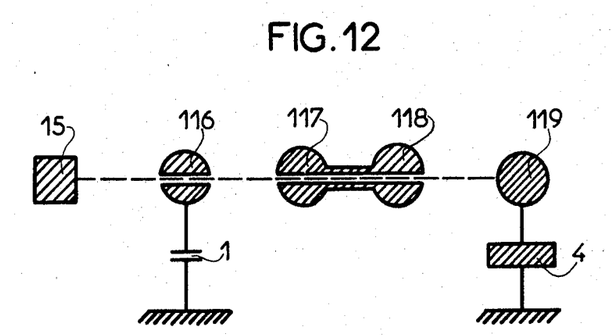
FIG. 12 shows a variant of the device according to FIG. 11.

In the embodiment represented in FIG. 12, the four electrodes 116, 117, 118, 119 are aligned, the first three being provided with a channel for passing the beam emitted by the laser 15. The beam may be stopped by the surface of the fourth electrode 119. In this case, the beam acts by ionization of the gases between the electrodes 116 and 117, on the one hand, and 118 and 119, on the other hand, the action being in this second case increased by the impact of the beam onto the electrode 119. This embodiment, which is not limited to two spark-gaps, allows an especially simple structure of the electrodes such as 117 and 118 which comprise two spheres connected by a tube. A simplified construction of the electrode and of the insulators is thus obtained. The invention is not limited to the examples of embodiments given above; it applies generally to the triggering of at least two sparks-gaps by means of only one laser beam.

The operation of the spark-gap according to the invention is as follows: in the case of the embodiment of FIGS. 3, 5, 6, 7, 8 and 9, when the storage 1 is charged and has a suitable energy, the laser sends a beam of luminous rays onto the surface of the electrode 2. The very significant energy of this beam enables the heating of the surface 2 which produces, on the one hand, the tearing away of free electrons from the electrode, this latter being generally made of a metal liable to show a thermionic effect, for example the brass with central protection made of tungsten, and on the other hand, the producing of a space charge in the immediate proximity of the electrodes.

At the same time, the heating of the electrode increases the electric conductivity of the dielectric medium and causes the triggering of the electric arc between 2 and 8.

As a matter of fact, the heating of the electrode and the heating of the dielectric medium by the heated electrode are not the only effects that produce the triggering of the arc.

The beam perpendicular or parallel to the axis of the electrodes may be focused (by a device not shown in the figures) in the space between the electrodes such as 2 and 7 of FIG. 3. In the case of the application of a triggered laser, owing to the high concentration of energy, the thermionic effect becomes negligible compared to the ionization of the gas by direct heating. The electrode, such as that shown at 2 in FIG. 3, is generally made of brass, but it is possible to adapt special structures of this electrode; for example, the brass electrode may comprise one or more parts made of tungsten in the places where the luminous ray of the laser is intended to strike. The current crosses the other electrode and produces an extremely powerful discharge into the load 4 (FIG. 1) which may be, for example, a gas tube.

The three effects (heating of the electrode, and direct and indirect heatings of the dielectric medium) are combined especially in the embodiments according to FIGS. 6, 8 and 12, where the laser beam passes through at least a portion of the space between the electrodes of the spark-gap. While focusing, the laser beam in this medium produces better results than sending parallel beam as far as heating is concerned; this is not necessary because a fourth factor plays a considerable role: a luminous beam is an electro-magnetic radiation that defines an electric and a magnetic field transversal to the propagation direction of this beam. When the luminous beam is a laser beam, that is a high energy coherent beam, the electric field created by this beam is very significant. When passing through a dielectric medium, this field is strong enough to dissociate gaseous molecules and create a partial ionization without direct or indirect significant heating. A focusing is not necessary therefor and, if the beam is strong enough and the spark-gap is narrow enough, the electric field is strong enough to tear away carriers from the space charge surrounding the negative electrode, thereby triggering an arc, even if the spark-gap is under vacuum.

This explains the functioning of the embodiments of FIGS. 4, 10, 11 and 12, where the laser beam, focused or not, is directed onto the space situated between the electrodes.

The above explanation concerns the operation of the spark-gap itself.

According to another aspect of the present invention directed to the case of a circuit used for research purposes, and more particularly for the study of the behavior of gases submitted to the action of an electrical arc, the circuit comprises as a load a gas tube having electrodes such as 5 and 6 and filled with said gas.

Good discharge characteristics imply not only the necessity of triggering an arc between the electrodes of the spark-gap 2–3, but also the necessity of favorizing the discharge through the load. According to another aspect of the invention, the laser beam triggering the spark-gap is also used for triggering or at least creating favorable conditions for triggering an arc in the gas tube.

Figure 9:
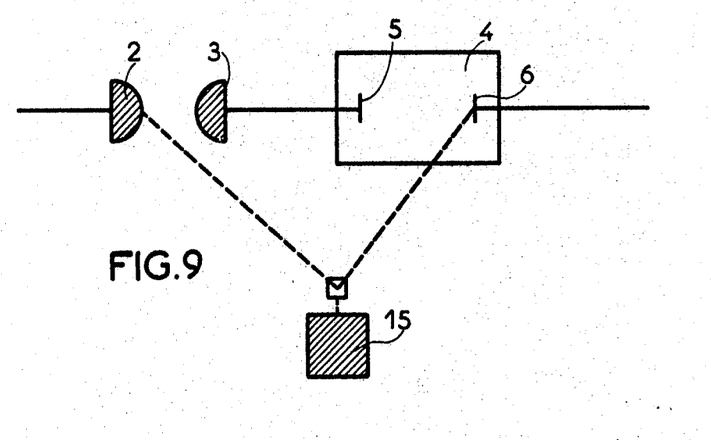

The triggering laser beam is then passing either through the gas tube, as shown in FIG. 8, or split into parts (as shown in FIG. 9). The laser beam acts in the discharge tube in the same manner as in the spark-gap itself.

As will be described hereinbelow, it is also possible to use counter-electrodes in the spark-gap and/or in the gas tube. Many other variants are possible, each one bringing specific advantages in accordance with the conditions of use of the present invention.

Figure 13:
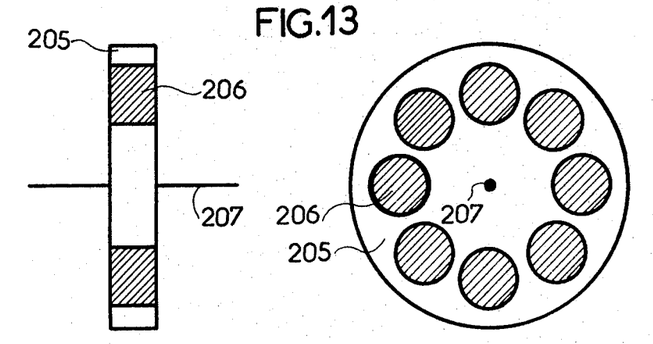
FIG. 13 represents a sectional view and a front view of a shield being part of a device according to another way of application of the invention.
Figure 14:
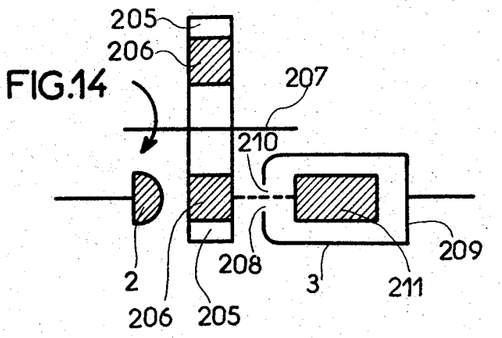
FIG. 14 represents a schematical view of a device according to the invention.

In the embodiment according to FIGS. 13 and 14, a barrel 205 is located between the electrodes 2 and 3. This barrel may revolve around an axis 207 and is set rotating by a mechanism not shown in the figures. The mechanism may be self-acting for a series of experiments. The barrel comprises a certain number of windows 206 in which are placed disks made of solid dielectric. The barrel itself may be made out of a rigid insulating substance, resisting very high temperatures. If the barrel is made of metal, the windows housing the insulating disks are large enough to prevent the metal of the barrel from initiating the discharge between the electrodes 2 and 3. The barrel is arranged so that the windows are located between the electrodes 2 and 3. The distance between the electrodes is determined so that the voltage of the storage 1 is higher than the breakdown voltage when there is no insulating material in the window 206. The electrode 2 may have any shape, while the electrode 3 is advantageously made according to the structure of the above-described electrodes. For example, the electrode may be made up of a cylindrical member closed by two surfaces 208 and 209, the surface 208 being matched to the surface of the electrode 2 and comprising an opening 210. A laser 211 is located inside the hollow electrode 3 (FIG. 14) so that the light beam which it produces be directed onto the electrode 2 through the opening 210. The control and supply of the laser are achieved by circuits which are not shown in the figures.

The insulating disks of the barrel may be made from a large number of substances, the selection of the substance depending mainly on the power of the laser used, on the fusibility of the substance, on the cost, on the required thickness, on the mechanical properties, etc.; for example, these substances may be polymers sold under the trade names Teflon, Polystyrene, Mylar, Bakelite, Celoron, Lucoflex, etc.

The operation of the device is as follows: a driving signal controls the triggering of the laser 211 which sends through the opening 210 a light beam which impinges upon the insulating disk 206 held in a window of the barrel 205. The high power radiation of the laser destroys this disk; the distance between the electrodes being such that in the absence of the insulating material 206 the potential difference is sufficient to cause the triggering of an electric arc in an extremely short time. The load inserted in the spark-gap circuit is crossed by a very intense current with a very steep rising front. When the storage 1 is fully run down, the electric arc dies out, and the mechanism connected to the barrel rotates the latter one step bringing an intact disk into the position of the disk which had been destroyed by the laser beam.

Figure 15:
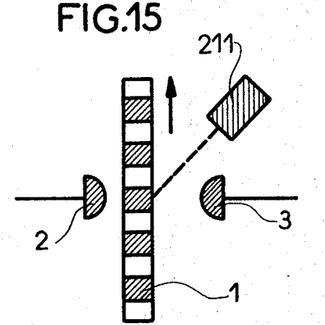
FIGS. 15 and 16 represent variants of the invention.
Figure 16:
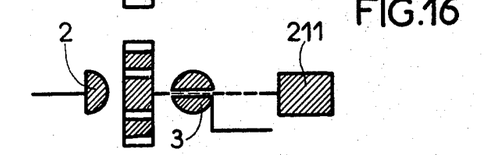

The spark-gap triggering device according to the invention offers many advantages which make it possible to use, in particular, a same spark-gap for a very broad voltage range, the switching from one voltage to another requiring only the replacement of the disks carried by the barrel. The design of the spark-gap in FIGS. 13 and 14 has been given only as an illustrating example, which is in no way limiting, many variants being possible without departing from the scope of the invention. For example, the dielectric shield between the electrodes may be shaped as a continuous strip with rectilinear motion, each motion replacing between the electrodes a destroyed section of dielectric by an intact one. As shown in FIG. 15, this strip may be a thick composite strip made of rigid material and provided with windows in which are housed dielectric disks. The laser may be located outside the electrodes and act upon the dielectric either obliquely as shown in FIG. 15 or through an opening provided in one of the electrodes as shown in FIG. 16. The entire spark-gap device may be either exposed or housed in a leak-tight enclosure filled with a gas under pressure. This aids the burning of the dielectric and participates in the melting, or it can prevent the burning so that the laser action on the dielectric is restricted to cause its melting. The device according to the invention offers a great number of advantages, among which the most important are the reduction of the spark-gap self-inductance and the possibility of realizing a spark-gap to be used for a range of voltage sources from 10 to 100 kv., by means of a very small modification of the distance between the electrodes.

Figure 17:
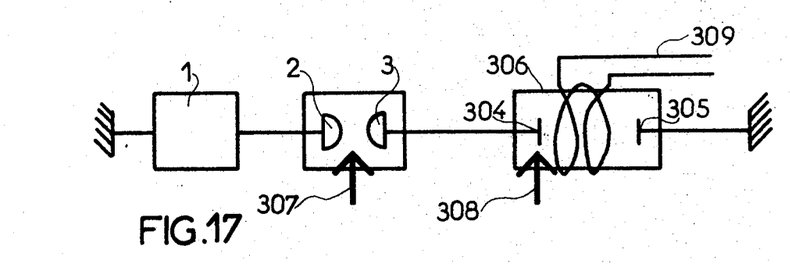
FIG. 17 shows schematically represented, an electric circuit used for gas ionization and striction experiments.

In an embodiment of the present invention, the laser beam used for the triggering of the spark-gap may be set into action in such a manner that its energy is realized in addition to the energy of the electric discharge in the spark-gap. It is thus possible to realize devices of quick discharge in enclosures used for the studying of plasmas. In FIG. 17 there is shown schematically a gas ionization and striction apparatus comprising an electric energy storage 1, one terminal of which is earthed, the other one being connected to the electrode 2 of the spark-gap made up of the electrodes 2 and 3, this latter being connected to one of the electrodes 304 of a gas discharge tube 306, the other electrode 305 of which being earthed. The spark-gap may be of the above-described type of spark-gaps. The discharge tube may comprise a device for partially ionizing the gas and an electromagnetic device constituted, for example, by a winding 309 generating a magnetic field and causing a magnetic striction of the plasma which may be produced in the tube.

The operation of the apparatus of FIG. 17 is as follows: The breakdown voltage of the dielectric located between the electrodes 2 and 3 being lowered by an adequate control device schematically represented by the arrow 307, arcing occurs between the electrodes and a very intense current flows, during a short time, in the load made up of the discharge tube 306. The gas within the tube 306 may be ionized by means of a device schematically represented by the arrow 308, synchronized with the device 307, the devices 307 and 308 being either confounded or have the same origin, the load presenting then a very reduced impedance. In order to concentrate between the electrodes of the load a maximum energy in a minimum time, it is important that the spark-gap 2–3 and the entire electric circuit have as low as possible an impedance. For the purpose of obtaining from some of the ionized gases a state usually called plasma, a very high energy density must be provided in the space between the electrodes 304 and 305 of the load 306. To this end, one may insert in the set-up a magnetic striction device, represented schematically by the winding 309 and also synchronously controlled by the device 308 which will tend to draw the high temperature gas away from the cold walls of tube 306.

In order to achieve a minimum impedance circuit, one is led to select coaxial arrangement apparatus comprising a gap of the "plate spark-gap" type. FIG. 18 is an example of this embodiment of the apparatus according to the invention. The apparatus comprises a spark-gap, the plates 321 of which are located between the electrodes 310 and 311, the electrode 310 being connected to the energy storage 1 while the electrode 311 is connected to the first electrode 312 of the discharge tube. The discharge tube comprises a housing 316 made of an insulating material and which may either be fully transparent or be provided with observation windows. The other electrode 313 of the discharge tube is connected to the bottom of the cylindrical conductor 317 surrounding completely the whole of the apparatus. This conductor may be provided with one or several windows such as 314 and 315. These windows may be used for the observation of the phenomena occurring inside the discharge tube as well as for the ingress of beams of visible or invisible electromagnetic radiations. According to the invention the apparatus comprises one or several lasers located inside or outside the coaxial assembly. The winding used for the magnetic striction of the plasma within the discharge tube is shown schematically in 309. A counter-electrode 319, integral with the conductor 317 via an insulating member 318, is located laterally with reference to the spark-gap while a laser 320 is located outside said conductor so that the beam which it emits impinges on the counter-electrode after passing through the window 315 and the space between the plates 321. The plates 321 are each provided with a number of holes, not shown in the figures, enabling a quick diffusion of the ionized gas which may be present between the spark-gap electrodes, thus improving the speed of formation of the electric arc at the time of the circuit discharge.

The operation of the apparatus according to FIG. 18 is as follows: The beam of the laser 320 impinges on the counter-electrode 319 which becomes heated and the neighboring gas is ionized, the ionizing effect concurring with the tearing away of electrons from the counter-electrode by thermionic effect. The ions diffuse rapidly between the plates and the spark-gap discharge is quickly triggered. The more capacitive the impedance of the circuit (this being a characteristic of the plate spark-gap and of the coaxial arrangement circuit), the quicker is the discharge.

Figure 19:
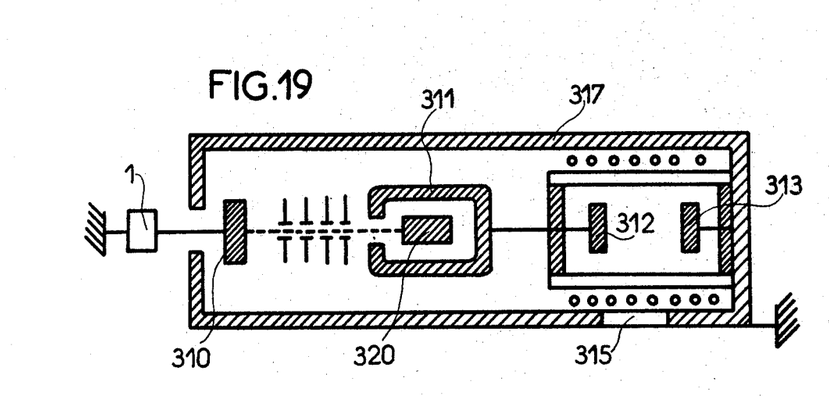
FIGS. 19, 20, 21, 22, 23 and 24 are sectional views of variants of application of the apparatus according to the invention.

FIG. 19 is a variant of such an apparatus where again the circiut shows a coaxial arrangement and the spark-gap is of the plate gap type. The second electrode 311 of the spark-gap is a hollow electrode in which is housed a laser 320. The laser luminous beam passes through an opening provided in the electrode 311 and through a number of aligned holes provided in the plates 321 and then impinges upon the surface of the electrode 310. The operation of this variant of the apparatus according to the invention is analogous to that of the embodiment shown in FIG. 3.

Figure 21:
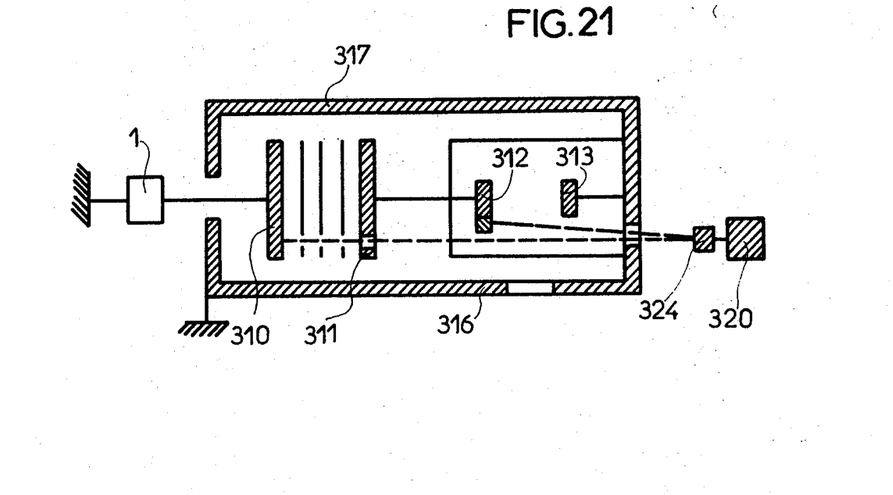

FIGS. 20 and 21 are examples of embodiments of the apparatus according to the invention in which the laser is located outside the coaxial assembly. In both cases, the device shown schematically at 324 enables the beam of the laser 320 to be split into two distinct beams, one being directed as previously towards an electrode 310 or a counter-electrode 319 of the spark-gap, the other one being directed towards an electrode 312 or a counter-electrode 322 located within the discharge tube 316. When a very high energy triggered laser is used, the beam, split according to the schematic devices shown in 324, is focused betwen the electrodes 312 and 313 which brings a remarkable energy to the plasma produced by the discharge. In this way, the laser triggers the spark-gap discharge but also contributes to the producing of a partial ionization of the gas in the discharge tube. The ionization of the gas of the discharge tube may be performed as a contribution to a conventional ionizing device or it may replace it altogether.

Figure 22:
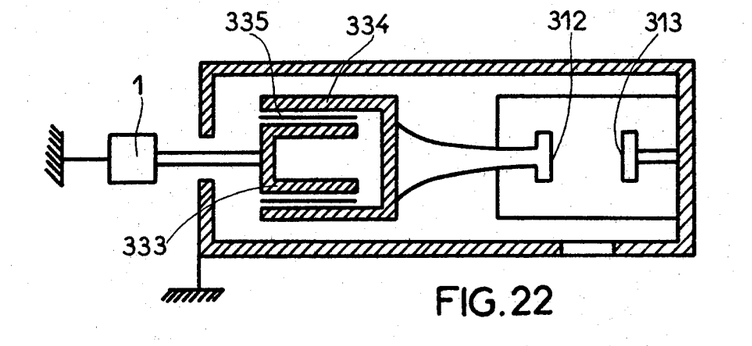

FIG. 22 is another example of embodiment of the apparatus according to the invention where the spark-gap is made up of two coaxial cylindrical conductors 333 and 334 disposed the one within the other. This spark-gap type may also comprise intermediate cylindrical conductors 335 provided with holes, these latter conductors acting as the plates 321 of the spark-gap shown in FIG. 18. The ionization of the gas of the spark-gap may be achieved according to the principles as embodied in FIGS. 18, 20 or 21, the advantage of this arrangement resting in that the counter-electrode function is performed by one of the conductors 333, 334 or 335.

Figure 23:
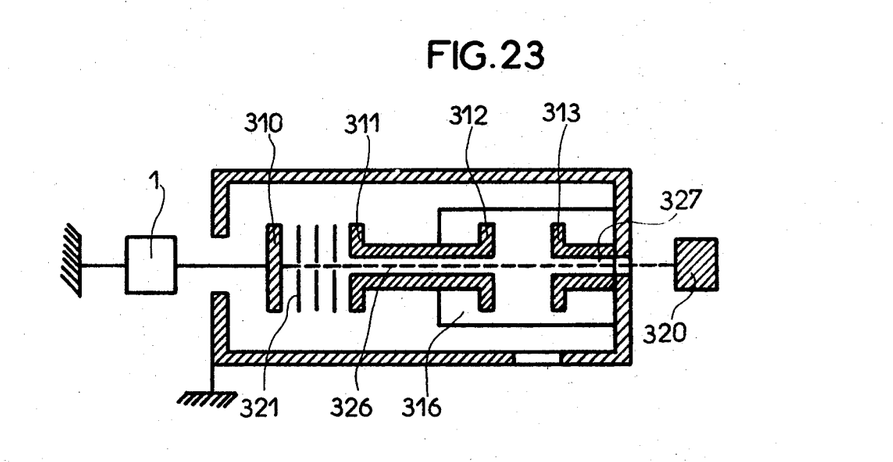

Another embodiment is shown in FIG. 23 where the electrodes 311 and 312 are composed of a single member provided with a channel 326, the electrode 313 having a channel 327 located in the lengthening of the former, and the plates 321 being provided with holes aligned on the same axis. In this case, the laser is located outside the apparatus and on its axis. The laser luminous beam impinges on the electrode 310 in order to trigger the circuit discharge and the passage of this beam through the tube 316 contributing, besides, to the ionization of the gas contained within the discharge tube. Moreover, the laser still located on the axis of the apparatus but sidewise of the spark-gap effects (without any deviation of the beam) the same result as the one shown in FIG. 19. Actually, the parallel part of the beam will trigger the spark-gap comprising the end disk 310 and 311 and may later be focused inside the electrodes 312 and 313 allowing thus the complementary ionization of the gas located between the electrodes.

Figure 24:
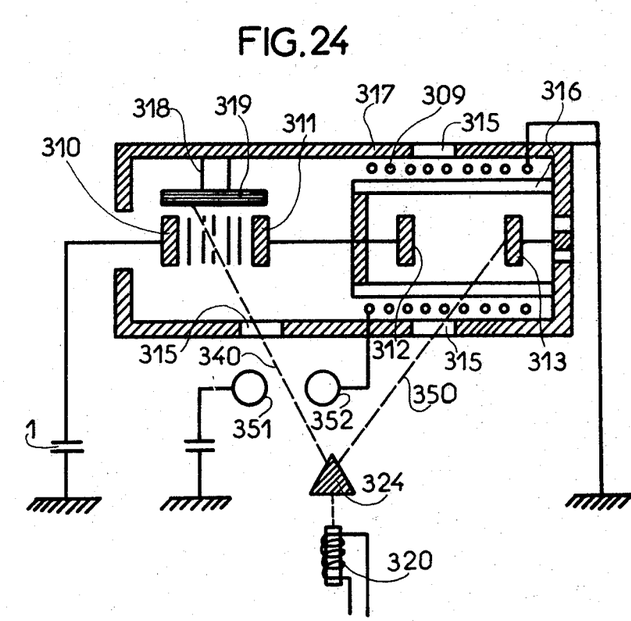

FIG. 24 shows another embodiment of an apparatus of the type of the one shown in FIG. 20. Here, the members analogous to those of FIG. 20 have been designated by the same reference numerals. For example, represented at 1 is the energy storage which may be a compensator, in 310 and 311 the electrodes of the spark-gap and in 319 a counter-electrode on which impinges the beam of the laser 320. As in the case of FIG. 20, the laser beam 320 is split into two beams 340 and 350, by the device 324 which may be a prism. According to this embodiment of the present invention, the winding 309 provided to obtain the magnetic striction is controlled by a spark-gap of the type described as regards FIG. 4, by means of one of the beams 340 or 350. As in the case of the FIG. 10, the beam 340, for instance, crosses first the space between the electrodes 351 and 352 of this spark-gap, and this allows to control absolutely simultaneously the striction winding and the discharge of the spark-gap between the electrodes 310 and 311. The set-up represented in FIG. 24 gives then a perfect synchronization. Such an embodiment will be preferentially obtained with a very high energy triggered laser.

In the examples of the embodiment of the invention described above, the assumption was made that the luminous beam of the laser was impinging upon a surface, whether it was that of an electrode or that of a counter-electrode. This assumption must not be taken with a restrictive meaning. The embodiment of the device with a triggered laser is particularly advantageous in the cases of the above-described examples since the non-triggered laser delivers only a relatively reduced luminous energy density. The use of triggered lasers allows a focusing of the luminous beam and hence the setting in action of higher energies. The heating of the gas is then obtained without any previous heating of a metallic surface, whether constituted by an electrode or by a counter-electrode. The application of the triggered lasers is particularly advantageous in the case of the devices embodied according to FIGS. 21, 22, 23, and 24 and it is in no way beyond the scope of the present invention. Furthermore, it is notable that the distant and external triggering of the arrangements described herein allows great security of use and operation, this being particularly valuable when very high voltages and very high energies are involved.

What is claimed is:

1. A device for controlling quick discharge of an electric energy circuit in a relatively weak load under high voltage comprising two electrode means defining a spark-gap, said electric circuit including said spark-gap, a discharge tube having two electrodes and forming the load of said electric circuit, and triggering means for triggering an electric discharge across said spark gap; said triggering means comprising one of said electrode means and a laser having high density energy luminous beam directed onto the surface of said one of said electrode means for emitting electric charge carriers within said spark-gap, said luminous beam traversing a part of the space within said discharge tube for improving the electric conductivity in said tube.

2. In a device according to claim 1 including means for splitting said luminous beam traversing a part of the space within said discharge tube whereby a part of said luminous beam is directed onto the surface of one of said electrodes of said discharge tube.

3. A device for controlling quick discharge of an electric energy storage means in an electric circuit comprising a relative weak load under high voltage, said electric circuit including two electrode means defining a spark-gap, a discharge tube having two electrodes and forming a load for said circuit, an electrically isolated counter-electrode disposed within said discharge tube, a cylindrical housing means having a metal portion and partially enclosing said electrode means and said discharge tube, a first conductor connecting one of said electrode means with one of the electrodes of said discharge tube, a second conductor connecting the second electrode of the discharge tube with said metal portion of said housing means and a third conductor connecting the second electrode means with said electric energy storage means, a metallic body located adjacent said spark-gap, a laser having a high density energy luminous beam directed onto the surface of said metallic body, and means for splitting said luminous beam whereby a part of said luminous beam is directed onto the surface of said counter-electrode.

4. A device for controlling quick discharge of an electric energy storage means in an electric circuit comprising a relatively weak load under high voltage, said electric circuit including a plurality of metallic electrode means defining a spark-gap, a discharge tube having two electrodes and forming a load for said circuit, a cylindrical housing means having a metal portion and enclosing said electrode means and said discharge tube, a first conductor connecting one of said electrode means with one of the electrodes of said discharge tube, a second conductor connecting said second electrode of said discharge tube with said metal portion of said housing means, and a third conductor connecting another of said electrode means with said electric energy storage means, a laser having a high density energy luminous beam directed onto the surface of one of the plurality of said metallic electrode means, and means for splitting said luminous beam whereby a part of said luminous beam is directed onto the surface of one of the electrodes of said discharge tube.

5. A device for controlling quick discharge of an electric energy circuit in a relatively weak load under high voltage comprising two metallic electrode means defining a spark-gap and triggering means for triggering an electric discharge across said spark-gap; said triggering means comprising one of said metallic electrode means and a laser having a high density energy luminous beam directed onto the surface of said one of said metallic electrode means for emitting electric charge carriers within said spark-gap, and a metallic plate means located in the space between said metallic electrode means and having an outer surface perpendicular to the direction of the electric field determined by metallic electrode means, said plate means having a plurality of apertures for fast diffusion of said electric charge carriers within said spark-gap.

6. The device according to claim 5, wherein the other of said metallic electrode means having an aperture, and said metallic plate having an additional aperture for allowing the passage of said luminous beam therethrough.

7. A device for controlling quick discharge of an electric energy storage means in an electric circuit comprising a relatively weak load under high voltage, said electric circuit including two metallic electrodes defining a spark-gap, a discharge tube having two electrodes forming a load for said electric circuit, one of the electrodes defining said spark-gap and one of the electrodes of said discharge tube being respectively formed by two end parts of a single element passing through a wall of said discharge tube, a cylindrical housing means having a metal portion, said housing means partially surrounding said electrode means and said discharge tube, a first conductor for connecting the second of said electrodes defining a spark-gap with an electric energy storage means and a second conductor connecting the other electrode of said discharge tube with the metallic portion of said housing means, triggering means for triggering a discharge across said spark-gap including a laser having a high density energy luminous beam directed onto the surface of said one of said metallic electrodes for emitting electric charge carriers within said spark-gap, said single element and said other electrode of said discharge tube having aligned axial channels extending therethrough, said housing means having a window, and said laser being located outside said housing means whereby said luminous beam is directed to said one of said metallic electrodes through said window and said channels thereby crossing the space enclosed by said discharge tube.

8. A device for controlling quick discharge of an electric energy storage means in an electric circuit comprising a relatively weak load under high voltage, said electric circuit including a plurailty of metallic electrode means defining a spark-gap, a discharge tube having two electrodes and forming a load for said circuit, a cylindrical housing means having a metal portion and partially enclosing said electrode means and said discharge tube, a first conductor connecting one of said electrode means with one of said electrodes of said discharge tube, a second conductor connecting said second electrode of said discharge tube with said metal portion of said housing means and a third conductor for connecting said second electrode means with said electric energy storage means, and a laser having a high density energy luminous beam directed onto the surface of one of said metallic electrode means, said electrode means having a generally cylindrical configuration and being coaxially positioned with an overlapping portion.

9. A device for controlling quick discharge of an electric energy circuit in a relatively weak load under high voltage comprising two metallic electrode means defining a spark-gap and triggering means for triggering an electric discharge across said spark-gap; said triggering means comprising one of said metallic electrode means and a laser having a high density energy luminous beam directed onto the surface of said one of said metallic electrode means for emitting electric charge carriers within said spark-gap, said one of said metallic electrode means being at least partially enclosed by a metallic cylindrical wall integral therewith and open towards the other of said metallic electrode means, said wall forming a spark shield, and having aperture means for the passage of said luminous beam through said wall towards said one of said metallic electrode means.

10. A device for controlling quick discharge of an electric energy circuit in a relatively weak load under high voltage comprising a plurality of metallic electrode means defining a spark-gap, and triggering means for triggering an electric discharge across said spark-gap; said triggering means comprising one of said metallic electrode means and a laser having a high density energy luminous beam directed onto the surface of one of said metallic electrode means for emitting electric charge carriers within said spark-gap, said electrode means being cylindrical and coaxially aligned for defining overlapping portions.

11. A device for controlling quick discharge of an electric energy storage means in an electric circuit under high voltage comprising a relatively weak load, said circuit including a plurality of metallic electrodes defining a spark-gap, a discharge tube having two electrodes, and forming a load for said circuit, a laser having a high density energy luminous beam directed onto the surface of one of said plurality of metallic electrode, a cylindrical metallic housing enclosing said metallic electrodes and said discharge tube, a first conductor connecting one of said metallic electrodes with one of the electrodes of said discharge tube, a second conductor connecting the other electrode of said discharge tube with a portion of said housing, and a third conductor connecting another of said metallic electrodes with said energy storage means.

12. A device for controlling quick discharge of an electric energy circuit under high voltage in a relatively weak load comprising two metallic electrodes defining a spark-gap, triggering means for triggering an electric discharge across said spark gap, said triggering means comprising one of said metallic electrodes and a laser having a high density energy luminous beam directed onto the surface of said one of said metallic electrodes, said beam being the sole breakdown agent of said spark-gap, the other of said metallic electrodes comprising a cavity for enclosing said laser and having aperture means directed toward said one of said metallic electrodes for permitting the passage of said luminous beam, thereby eliminating electrostatic and electromagnetic influence on said laser.

13. A device for controlling quick discharge of an electric energy circuit in a relatively weak load under high voltage comprising, at least two metallic electrode means defining a spark-gap and triggering means for triggering an electric discharge across said spark-gap, said triggering means comprising a laser having a high density energy luminous beam pulse directed through said spark-gap without impinging said electrode means, the luminous beam crossing said spark-gap being the sole breakdown triggering agent for this gap.

14. A device for controlling quick discharge of an electric energy circuit in a relatively weak load under high voltage comprising, aligned pairs of metallic electrodes defining a plurality of spark-gaps and triggering means for simultaneously triggering an electric discharge across said spark-gaps, said triggering means comprising a laser having a single high density energy luminous beam directed through said spark-gaps without impinging said electrodes, said luminous beam being the sole breakdown agent for said spark-gaps.

References Cited

UNITED STATES PATENTS

| | | | |
|---|---|---|---|
| 2,220,551 | 11/1940 | Shimizu et al. | 315—149 |
| 2,405,071 | 7/1946 | Tonks | 315—149 |
| 3,141,111 | 7/1964 | Godlove | 315—150 |
| 3,294,970 | 12/1966 | Jenckel | 315—150 |
| 3,350,602 | 10/1967 | Germeshausen et al. | 315—150 |

OTHER REFERENCES

Physical Review Letters, "Laser Beam Induced Electron Emission," by Lichtman et al., pp. 342–45, Apr. 15, 1963.

IBM Technical Discl. Bul., "Conduction Via Tracks Ionized by a Laser," by Anderson, May 1963, pp. 71, 72.

JERRY D. CRAIG, Primary Examiner

U.S. Cl. X.R.

315—155, 159